United States Patent
Palalau

[11] Patent Number: 5,905,480
[45] Date of Patent: May 18, 1999

[54] FLAT PANEL ICON DISPLAY SCHEME

[75] Inventor: Silviu Palalau, Birmingham, Mich.

[73] Assignee: UT Automotive Dearborn, Inc., Dearborn, Mich.

[21] Appl. No.: 08/623,440

[22] Filed: Mar. 28, 1996

[51] Int. Cl.$^6$ .................................................. G09G 3/12
[52] U.S. Cl. ................................ 345/45; 345/33; 345/36; 345/35; 345/83
[58] Field of Search ................ 340/825.17, 815.43, 340/815.55, 815.56, 815.54, 815.64; 345/30, 32, 34, 33, 43, 45, 47, 102, 4, 83, 150, 35, 39, 36; 252/301.65

[56] References Cited

U.S. PATENT DOCUMENTS

| | | | |
|---|---|---|---|
| 3,909,823 | 9/1975 | Knowlton | 345/32 |
| 3,987,401 | 10/1976 | Irvin | 345/39 |
| 4,218,636 | 8/1980 | Miyazawa | 345/47 |
| 4,672,264 | 6/1987 | Higton . | |
| 4,754,202 | 6/1988 | Havel | 345/150 |
| 5,006,277 | 4/1991 | Yoneshima et al. | 252/301.65 |
| 5,369,416 | 11/1994 | Haverty et al. | 345/35 |
| 5,442,338 | 8/1995 | Ayres et al. | 340/815.64 |
| 5,451,980 | 9/1995 | Simon et al. | 345/32 |
| 5,508,585 | 4/1996 | Butt . | |

Primary Examiner—Richard A. Hjerpe
Assistant Examiner—Kent Chang
Attorney, Agent, or Firm—Ozer M. N. Teitelbaum

[57] ABSTRACT

The present invention teaches a flat panel display system for illuminating an icon having a shape. The system comprises a first set of illuminators for illuminating the icon with a first color light beam in response to a first signal. The first set comprises a first and second pair of electrodes. Each pair of the first set comprising a top electrode and a bottom electrode, wherein the top and bottom electrodes of the first pair overlapping to form a first overlap region. Moreover, the top and bottom electrodes of the second pair overlapping to form a second overlap region, wherein the first and second overlap regions outline the shape of the icon. Further, a second set of illuminators is incorporated for illuminating the icon with a second color light beam in response to a second signal, such that the second set comprises a third and fourth pair of electrodes. Each pair of the second set comprises a top electrode and a bottom electrode, such that the top and bottom electrodes of the third pair overlap to form a third overlap region and the top and bottom electrodes of the fourth pair overlap to form a fourth overlap region, while the third and fourth overlap regions outline the shape of the icon. Finally, the system comprises a signal generator for selectively generating the first and second signals.

23 Claims, 3 Drawing Sheets

FLAT PANEL ICON DISPLAY SCHEME

FIELD OF THE INVENTION

This invention relates generally to flat panel displays, and more particularly flat panel icon display schemes.

BACKGROUND OF THE INVENTION

Until recently, the cathode ray tube ("CRT") has been the display device of choice for displaying information. While having sufficient display characteristics with respect to color, brightness, contrast, and resolution, CRTs are relatively bulky and power inefficient. In view of the advent of portable laptop computers, the demand for a feasible display technology which is lightweight, reliable, compact, and power efficient is growing.

Within the automotive industry, an examination has recently begun as to human factors generally, and more particularly, the use of technology in everyday life. One such example is in the area of displaying icons in the form of information gauges on the instrument panel of the automobile. Presently, icons display information only upon the occurrence of a particular condition. Such display systems are realized by one of several approaches, including vacuum fluorescent and liquid crystal display technology, as well as custom icon design systems illuminated by a traditional light bulb, for example.

The known icon display art has several disadvantages. Vacuum fluorescent systems offer substantially low resolution, while liquid crystal displays ("LCDs") do not properly function within the operating temperature range of automobiles. Further, these known systems are also bulky. Custom icon design systems for automotive applications moreover offer only a single color. These known display systems cannot properly be placed directly within a windshield, as vacuum fluorescent display systems lack the requisite transparency and LCDs lack a sufficiently wide enough operating temperature range.

In view of these concerns, industry requires a flat panel icon display system which offers high resolution, and which is space efficient. Further, a demand exists for a flat panel icon display system which can project onto a windshield, or in the alternative, be placed within a windshield directly.

SUMMARY OF THE INVENTION

The primary advantage of the present invention is to overcome the limitations of the prior art.

A further advantage of the present invention is to provide a flat panel icon display system which offers high resolution.

Another advantage of the present invention is to provide a flat panel icon display system which is space efficient.

Yet another advantage of the present invention is to provide a flat panel icon display system which can project onto a windshield, or in the alternative, be placed within a windshield directly.

In order to achieve the advantages of the present invention, a flat panel display system for illuminating a shaped icon is disclosed. The system comprises a first set of illuminators for illuminating the icon with a first color light beam in response to a first signal. The first set comprises a first and second pair of electrodes. Each pair of the first set comprising a top electrode and a bottom electrode, wherein the top and bottom electrodes of the first pair overlapping to form a first overlap region. Moreover, the top and bottom electrodes of the second pair overlapping to form a second overlap region, wherein the first and second overlap regions outline the shape of the icon. Further, a second set of illuminators is incorporated for illuminating the icon with a second color light beam in response to a second signal, such that the second set comprises a third and fourth pair of electrodes. Each pair of the second set comprises a top electrode and a bottom electrode, such that the top and bottom electrodes of the third pair overlap to form a third overlap region and the top and bottom electrodes of the fourth pair overlap to form a fourth overlap region, while the third and fourth overlap regions outline the shape of the icon. Finally, the system comprises a signal generator for selectively generating the first and second signals.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the present disclosure are not to scale but are merely schematic representations and are not intended to portray the specific parameters or the structural details of the invention, which can be determined by one of skill in the art by examination of the information herein.

DETAILED DESCRIPTION OF THE PREFERRED EMBODIMENTS

Figure 1A:
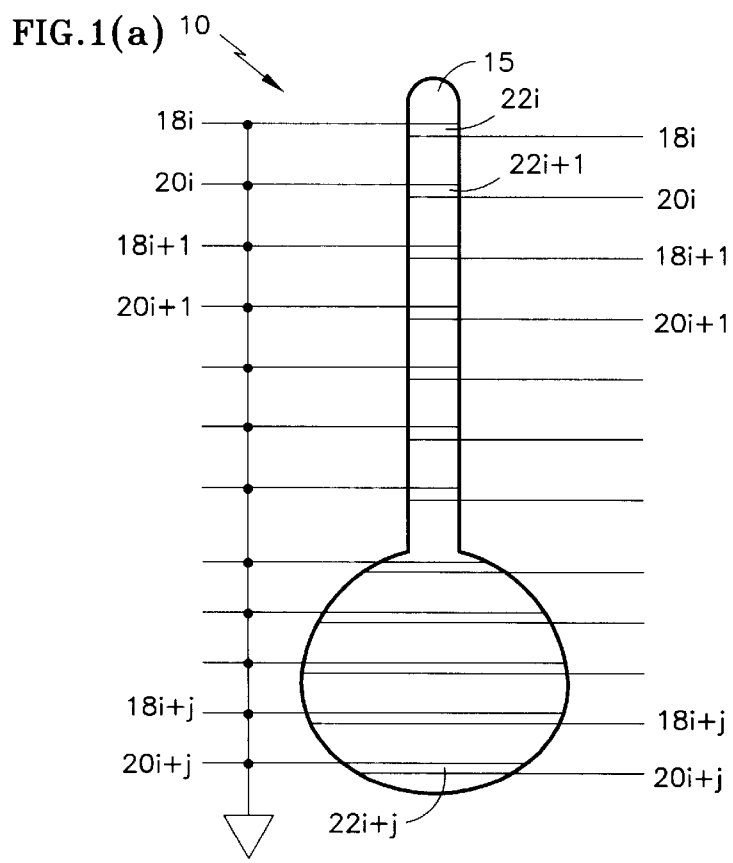
FIGS. 1(a) and 1(b) illustrate a first embodiment and preferred embodiment, respectively, of the present invention.

Referring to FIG. 1(a), a first embodiment of a flat panel icon display system 10 of the present invention is illustrated. Functionally, system 10 illuminates icon 15 according to a first color, a second color, or a combination of the first and second colors, thereby making system 10 multichromatic.

Display system 10 comprises a first set of illuminators, $18_i$–$18_{i+j}$. The first set of illuminators, $18_i$–$18_{i+j}$, are responsible for illuminating icon 15 with a first color beam in response to a first signal. The first signal is generated by a signal generator, further detailed in FIGS. 3 and 4. Each illuminator of first set, $18_i$–$18_{i+j}$, preferably comprises a top and bottom electrode pairing. The top electrode of each of pairing is directly coupled with the signal generator, while the bottom electrode of each of pairing is coupled to floating ground.

Likewise, display system 10 also comprises a second set of illuminators, $20_i$–$20_{i+j}$. The second set of illuminators, $20_i$–$20_{i+j}$, illuminates icon 15 with a second color beam in response to a second signal generated by the signal generator 25. Each illuminator of second set, $20_i$–$20_{i+j}$, preferably comprises a top and bottom electrode pairing. The top electrode of each of pairing is directly coupled with the signal generator, while the bottom electrode of each of pairing is coupled to floating ground.

Each top and bottom electrode pairing from each set of illuminators, $18_i$–$18_{i+j}$ and $20_i$–$20_{i+j}$, comprise an overlap region, $22_i$–$22_{i+j}$. Overlap regions, $22_i$–$22_{i+j}$, outline the shape of icon 15. In the preferred embodiment of the present invention, the number of overlap regions created by each top and bottom electrode creates a density of up to 80 lines per inch to provide the icon with visual continuity. Moreover, overlap regions, $22_i$–$22_{i+j}$, alternately correspond with first and second illuminators, $18_i$–$18_{i+j}$ and $20_i$–$20_{i+j}$. As such, the colors generated by overlap regions, $22_i$–$22_{i+j}$, alternate between the first and second color to enable display system 10 to be multichromatic.

It should be noted that the present invention provides illumination through a substrate matrix comprising ZnS, and/or ZnSe, and/or SrSe, and/or CaS, for example. To enable it generate light, the substrate matrix is doped with an element or combination of elements such as Cu, Mn, $TbF_3$, $PrF_3$, Ce, Te or Eu, for example.

In order to generate a color light beam, the relevant bottom electrode preferably comprises a reflective material, including aluminum or gold, either of which doped with W, Mo, Ta, Rh, or Os, for example. In contrast, the relevant top electrode preferably comprises a transparent conductive material, such as indium tin oxide ("ITO") for example. By this combination, the color light beam generated may be projected onto a surface, such as a windshield. In an alternate embodiment of the present invention, the bottom electrode preferably comprises a transparent conductive material, such that display system 10 may be inserted within a windshield.

The light beam generated between a particular pair of top and bottom electrodes is colorized using various techniques. In the preferred embodiment, a color filter is positioned superjacent both the overlap regions and the bottom electrodes, as well as subjacent the top electrodes, to colorize the light beam with the first color. However, in an alternate embodiment, the substrate area of each overlap region associated with a particular color is implanted with a dopant. Thus, to generate a first color, the substrate area for the first grouping of overlap regions is implanted with an element or combination of elements such as Cu, Mn, $TbF_3$, $Pr_3$, Ce, Te or Eu, for example, while the substrate area for the second grouping of overlap regions is implanted with a different doping element or combination of elements such as Cu, Mn, $TbF_3$, $PrFJ_3$, Ce, Te or Eu. Still in a further embodiment of the present invention, the first grouping of overlap regions comprise a first etched phosphor compound, while the second grouping of overlap regions comprise a second etched phosphor compound. To effectively create two distinct colors, the first and second etched phosphor compounds each comprise a different element or combination of elements such as Cu, Mn, $TbF_3$, $PrF_3$, Ce, Te or Eu, for example.

Figure 1B:
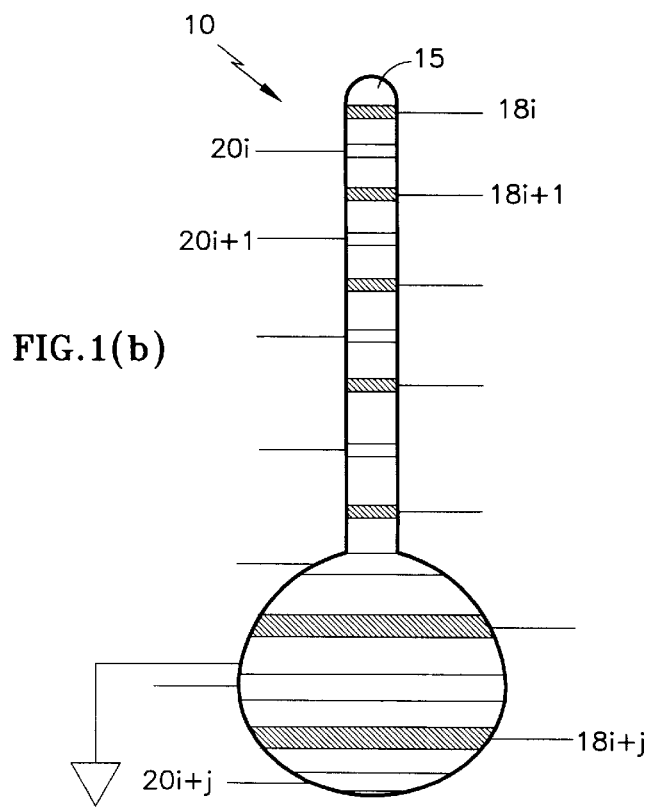

Referring to FIG. 1(b), the preferred embodiment of flat panel icon display system 10 of the present invention is illustrated. Much like the alternate embodiment of FIG. 1(a), display system 10 comprises a first set of illuminators, $18_i$–$18_{i+j}$, for illuminating icon 15 with a first color beam in response to a first signal, and a second set of illuminators, $20_i$–$20_{i+j}$, for illuminating icon 15 with a second color beam in response to a second signal. Further, as detailed in FIG. 1(a), each illuminator of both first and second sets, $18_i$–$18_{i+j}$ and $20_i$–$20$,+j, preferably comprises a top and bottom electrode pairing for which the top electrode of each of pairing is directly coupled with the signal generator. However, in contrast to the alternate embodiment depicted in FIG. 1(a), according to the preferred, the bottom electrode of each of pairing are uniformly constructed such that each are coupled to one another. By this arrangement, the bottom electrode of each of pairing is grounded through the outer periphery of icon 15.

Figure 2:
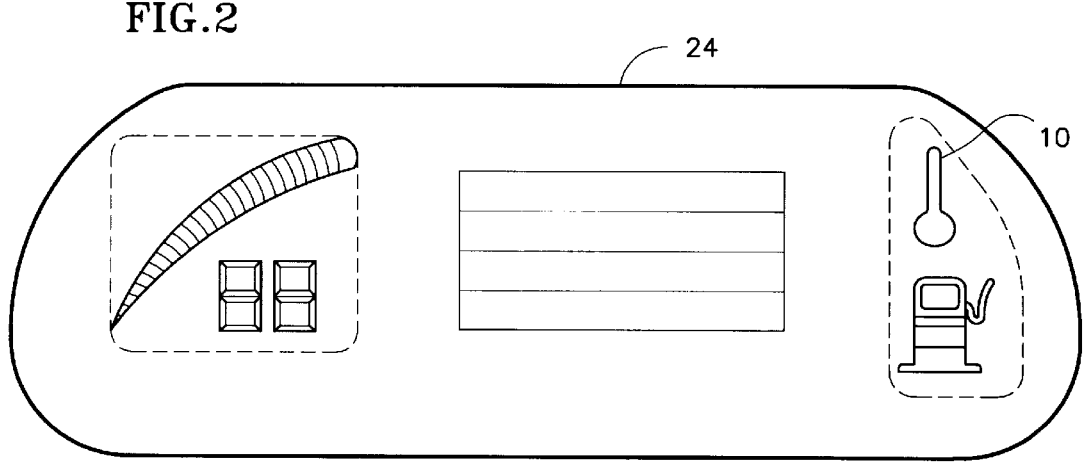
FIG. 2 illustrates a first application of the present invention.

Referring to FIG. 2, a first application of display system 10 of FIG. 1 is shown. Here, an instrument panel 24 is depicted. Instrument panel 24 comprises several warning gauges or icons, including a temperature display icon 10. Temperature display icon 10 illuminates according to a first color, for example, red when a first condition is present. Likewise, when a second condition is present, display icon 10 is illuminated according to a second color, for example, green.

Referring to FIG. 3, a block diagram of a first realization of the signal generator 25 for driving the flat panel icon display system 10 of the present invention is illustrated. Generator 25 comprises a video controller 28, which in response to a $V_{data}$ signal, generates a control signal received by both a red panel driver 32 and a green panel driver 34. Moreover, generator 25 comprises a panel power supply 30. Supply 30 receives power from a battery (not shown), and provides positive, negative, and a ground terminals. The positive output signal $V_+$ is fed to both red and green panel drivers 32 and 34. Panel drivers 32 and 34 are each coupled with a color grouping of top electrodes, $18_i$–$18_{i+j}$ and $20_i$–$20_{i+j}$. The negative output V of supply 30 is coupled with the bottom electrodes of both panel drivers, 32 and 34, and is also coupled with a floating ground. Thus, in response to receiving the $V_{data}$ signal, $V_+$ and $V_-$, one or both color groupings of electrodes may transmit information to illuminate icon 15.

In a further alternate embodiment of the present invention, panel power supply 30 is further coupled with a dimmer 36. As the brightness of the display system corresponds with the voltage level employed, dimmer 36 functionally controls the voltage output levels of $V_+$ and $V_-$.

Figure 3A:
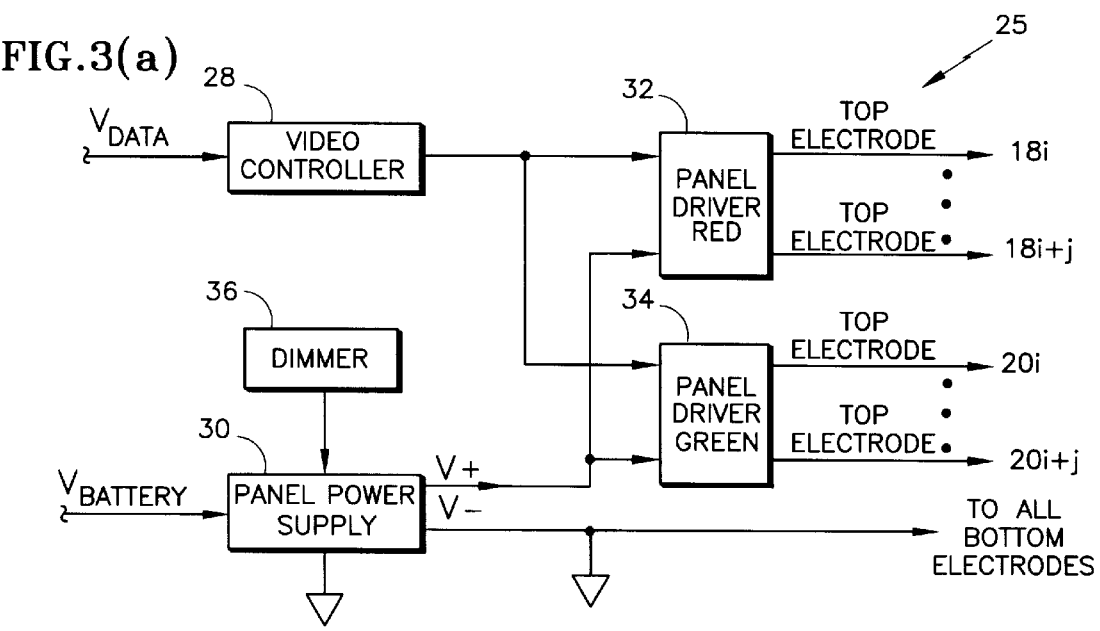
FIGS. 3(a) and 3(b) illustrate a block diagram of a first system design for driving the preferred embodiment and a graphical representation of a feature of the block diagram.
Figure 3B:
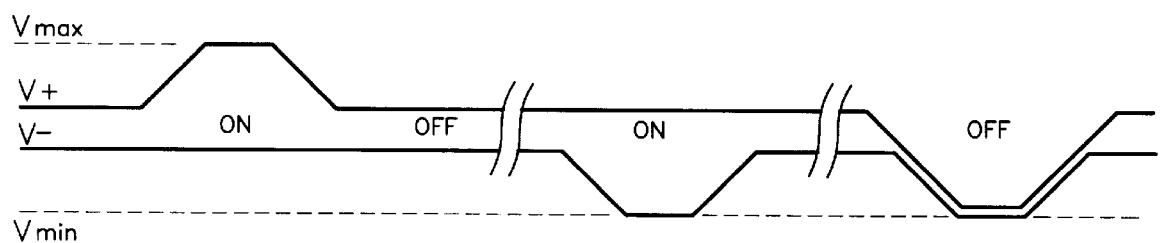

Referring to FIG. 3(b), a graphical representation of voltage output levels of $V_+$ and $V_-$ of the block diagram shown in FIG. 3(a) is illustrated. As shown, both panel drivers 32 and 34 are turned on when voltage output levels of $V_+$ is set at $V_{max}$ and $V_-$ is set at zero such that the effective difference between $V_+$ and $V_-$ is $|V_{max}|$. As $|V_{min}|$ is equal to $|V_{max}|$, both panel drivers 32 and 34 are turned on when voltage output levels of $V_-$ is set at $V_{min}$ and $V_+$ is set at zero such that the effective difference between $V_+$ and $V_-$ is $|V_{min}|$. Moreover, both panel drivers 32 and 34 are turned off when the effective difference between $V_+$ and $V_-$ is zero where $V_+$ and $V_-$ are both set to zero, $V_{min}$ or $V_{max}$.

Figure 4:
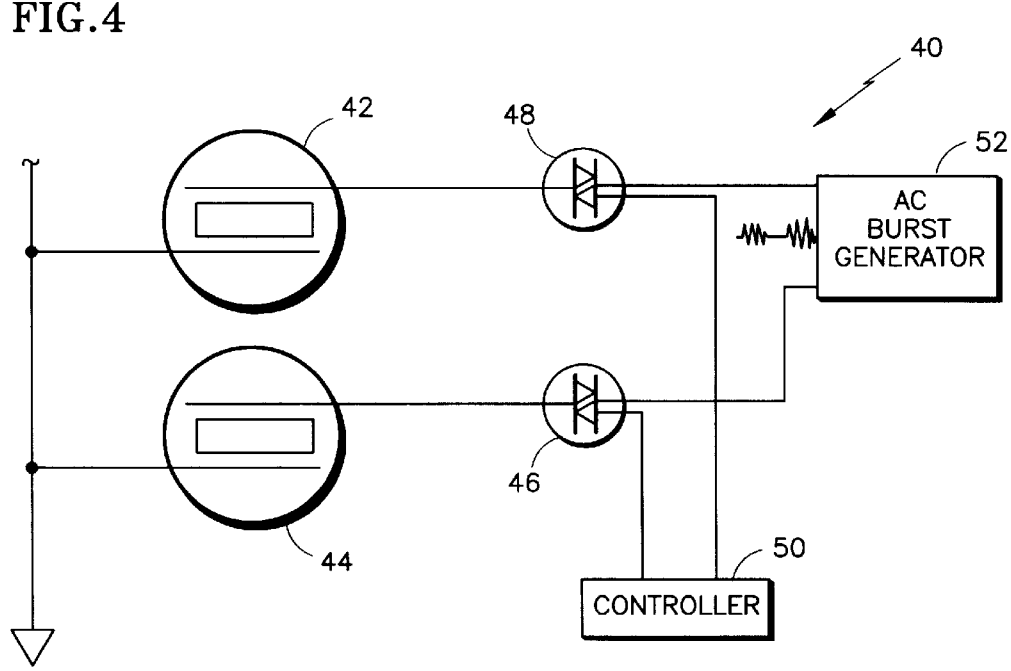
FIG. 4 illustrates a block diagram of the preferred system design for driving the preferred embodiment.
Figure 4:
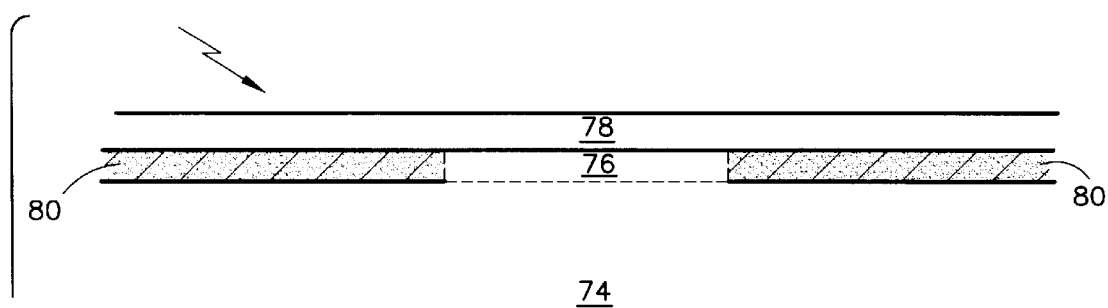

Referring to FIG. 4, a block diagram of the preferred realization of a signal generator 40 for driving the flat panel icon display system of the present invention is illustrated. Signal generator 40 comprises a series of electrode pairs, such as a first and a second electrode pair, 42 and 44, corresponding with a first and a second color. First and second electrode pairs, 42 and 44, are each coupled with an analog switching device 46 and 48 respectively. Analog switching devices 46 and 48 functionally control their respective electrode pairs in response to several signal inputs, including an enable/disable signal generated by a controller 50. As such, devices 46 and 48 preferably each comprise a triac semiconductor device. Upon receiving an enable signal, the respective electrode pair is enabled to receive an AC signal from an AC burst generator 52. As a result, the respective electrode pair, and as such the display icon, is accordingly illuminated.

Figure 5:
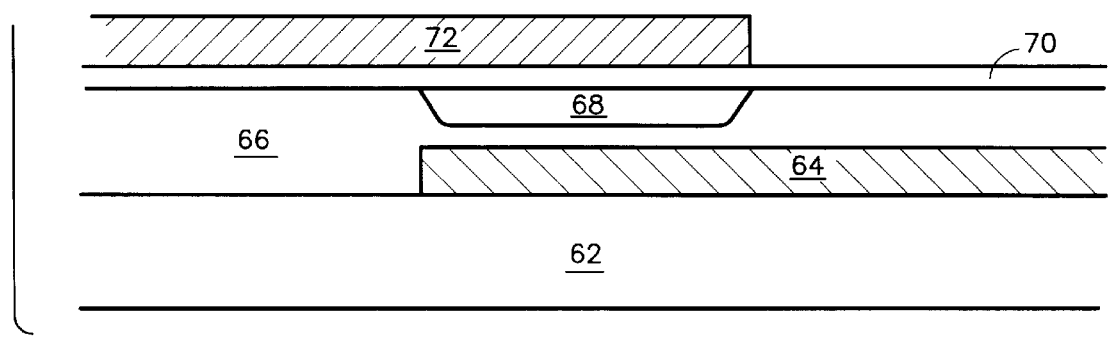
FIG. 5 illustrates a cross sectional diagram of an aspect of the preferred embodiment.

Referring to FIG. 5, a cross sectional perspective of the preferred embodiment of display system 10 is illustrated. System 10 comprises a base substrate 62. Positioned superjacent substrate 62 is a bottom electrode 64. In the preferred embodiment, bottom electrode 64 comprises aluminum to enable icon display 10 to project onto a surface material. In an alternate embodiment, bottom electrode 64 comprises a transparent material, such as glass or indium tin oxide ("ITO"), to enable icon display 10 to illuminate through a transparent material.

Superjacent bottom electrode 64 is a first and second dielectric layer, 66 and 70. First and second dielectric layers, 66 and 70, preferably comprise a relatively high relative permittivity constant, such as $SiO_x N_x$ or $BaTiO_3$. Sandwiched between both first and second layers, 66 and 70, is a phosphor compound layer 68 for providing the basis of the illumination for the display system.

Positioned superjacent both second dielectric layer 70 and phosphor layer 68 is top electrode 72. Top electrode comprises a transparent material, such as indium tin oxide ("ITO"), to enable the light beam generated by means of phosphor layer 68 to illuminate through a transparent material 74. When a threshold voltage is applied across top and bottom electrodes, phosphor layer 68 generates a light beam. In the preferred embodiment, the light beam generated is transmitted by the reflective nature of bottom electrode 64 through the transparent top electrode 72, and a transparent filling material 74 positioned superjacent thereto. Once passing through filling material 74, the light beam is colorized by color filter 76 and subsequently emitted through glass layer 78. Color filter 76 is surrounded light absorbing material 80 having a black pigment to provide greater contrast. It should be noted that according to this embodiment, phosphor layer 68 may completely fill the shape of the icon to generate the light beam which is subsequently colorized by differing color filters.

In an alternate embodiment of the present invention, phosphor layer 68 is implanted with a particular dopant to provide an initial colorized light beam. As detailed herein, a list of applicable dopants include, but is not limited to Cu, Mn, $TbF_3$, $PrF_3$, Ce, Te or Eu. By this embodiment, a color filter is not required. However, utilizing the principles of the present invention, a polychromatic icon display system may also designed employing both a color filter and a pair of implanted phosphor layers.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, while the present disclosure details an icon display system, it should be apparent that the present invention is applicable to text display systems as well. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A flat panel display system for illuminating an icon, the icon having a shape, the system comprising:
    a first set of illuminators for illuminating the icon with a first color light beam in response to a first signal,
    said first set comprising a first and second pair of electrodes, each pair of said first set comprising a top electrode and a bottom electrode each of which generate an electric field, said top and bottom electrodes of said first pair overlapping to form a first overlap region and said top and bottom electrodes of said second pair overlapping to form a second overlap region, said first and second overlap regions outlining the shape of the icon;
    a second set of illuminators for illuminating the icon with a second color light beam in response to a second signal, said second set comprising a third and fourth pair of electrodes, each pair of said second set comprising atop electrode and a bottom electrode each of which generate an electric field, said stop and bottom electrodes of said third pair overlapping to form a third overlap region and said top and bottom electrodes of said fourth pair overlapping to form a fourth overlap region, said third and fourth overlap regions outlining the shape of the icon; and
    a signal generator for selectively generating said first and second signals such that if said first signal is generated, the electric fields created by said top and bottom electrodes of said first set illuminate the icon, and if said second signal is generated, the electric fields created by said top and bottom electrodes of said second set illuminate the icon.

2. The display system of claim 1, wherein said first set of illuminators comprises a first color filter for colorizing a first light beam with said first color.

3. The display system of claim 2, wherein said second set of illuminators comprises a second color filter for colorizing a second light beam with said second color.

4. The display system of claim 1, wherein said first and second overlap regions comprise a first dopant implanted into a substrate for illuminating said first color light beam, and said third and fourth overlap regions comprise a second dopant implanted into a substrate for illuminating said second color light beam.

5. The display system of claim 4, wherein at least one of said first and second implanted dopants comprise at least one of Cu, Mn, $TbF_3$, $PrF_3$, Ce, Te or Eu.

6. The display system of claim 1, wherein said bottom electrodes of at least one of said first and second set of illuminators comprise a reflective material.

7. The display system of claim 6, wherein said bottom electrodes of at least one of said first and second set of illuminators comprises a transparent material.

8. The display system of claim 1, wherein said first and second overlap regions comprise a first etched phosphor compound for illuminating said first color light beam, and said third and fourth overlap regions comprise a second etched phosphor compound for illuminating said second color light beam.

9. The display system of claim 8, wherein at least one of said first and second phosphor compounds comprises Cu, Mn, $TbF_3$, $PrF_3$, Ce, Te or Eu.

10. A multichromatic flat panel display system for displaying an icon having a shape on a transparency, the system comprising:
    a first set of illuminators for illuminating the icon with a first color light beam in response to a first signal, said first set comprising a first and second pair of electrodes, each pair of said first set comprising a top electrode and a bottom electrode each of which generate an electric field, said top and bottom electrodes of first and second pair comprising a transparent material, said top and bottom electrodes of said first pair overlapping to form a first overlap region and said top and bottom electrodes of said second pair overlapping to form a second overlap region, said first and second overlap regions outlining the shape of the icon;

a second set of illuminators for illuminating the icon with a second color light beam in response to a second signal, said second set comprising a third and fourth pair of electrodes, each pair of said second set comprising a top electrode and a bottom electrode each of which generate an electric field, said top and bottom electrodes of said third and fourth pair of electrodes comprising a transparent material, said top and bottom electrodes of said third pair overlapping to form a third overlap region and said top and bottom electrodes of said fourth pair overlapping to form a fourth overlap region, said third and fourth overlap regions outlining the shape of the icon; and a multichromatic panel driver for selectively generating said first and second signals such that if said first signal is generated, the electric fields created by said first and second pair of top and bottom electrodes illuminates the icon according to said first color, and if said second signal is generated, the electric fields created by said third and fourth pair of top and bottom electrodes illuminates the icon according to said second color.

11. The multichromatic flat panel display of claim 10, wherein said first set of illuminators comprises a first color filter for colorizing a first light beam with said first color, and said second set of illuminators comprises a second color filter for colorizing a second light beam with said second color.

12. The multichromatic flat panel display of claim 10, wherein said first and second overlap regions comprise a first dopant implanted into a substrate for illuminating said first color light beam, and said third and fourth overlap regions comprise a second dopant implanted into a substrate for illuminating said second color light beam.

13. The multichromatic flat panel display of claim 12, wherein at least one of said first and second implanted dopants comprise at least one of Cu, Mn, TbF$_3$, PrF$_3$, Ce, Te or Eu.

14. The multichromatic flat panel display of claim 10, wherein said transparent material comprises indium tin oxide ("ITO").

15. The multichromatic flat panel display of claim 10, wherein said first and second overlap regions comprise a first etched phosphor compound for illuminating said first color light beam, and said third and fourth overlap regions comprise a second etched phosphor compound for illuminating said second color light beam.

16. The multichromatic flat panel display of claim 15, wherein at least one of said first and second phosphor compounds comprises Cu, Mn, TbF$_3$, PrF$_3$, Ce, Te or Eu.

17. A multichromatic flat panel display system for projecting an icon having a shape onto a transparency, the system comprising:

a first set of illuminators for illuminating the icon with a first color light beam in response to a first signal, said first set comprising a first and second pair of electrodes, each pair of said first set comprising a top electrode and a bottom electrode each of which generate an electric field, said top electrodes of first and second pair comprising a transparent material, said bottom electrodes of first and second pair comprising a reflective material, said top and bottom electrodes of said first pair overlapping to form a first overlap region and said top and bottom electrodes of said second pair overlapping to form a second overlap region, said first and second overlap regions outlining the shape of the icon;

a second set of illuminators for illuminating the icon with a second color light beam in response to a second signal, said second set comprising a third and fourth pair of electrodes each of which generate an electric field, each pair of said second set comprising a top electrode and a bottom electrode, said top electrodes of said third and fourth pair of electrodes comprising a transparent material, said bottom electrodes of third and fourth pair comprising a reflective material, said top and bottom electrodes of said third pair overlapping to form a third overlap region and said top and bottom electrodes of said fourth pair overlapping to form a fourth overlap region, said third and fourth overlap regions outlining the shape of the icon; and a multichromatic panel driver for selectively generating said first and second signals such that if said first signal is generated, the electric fields created by said first and second pair of top and bottom electrodes illuminates the icon according to said first color, and if said second signal is generated, the electric fields created by said third and fourth pair of top and bottom electrodes illuminates the icon according to said second color.

18. The multichromatic flat panel display of claim 17, wherein said first set of illuminators comprises a first color filter for colorizing a first light beam with said first color, and said second set of illuminators comprises a second color filter for colorizing a second light beam with said second color.

19. The multichromatic flat panel display of claim 17, wherein said first and second overlap regions comprise a first dopant implanted into a substrate for illuminating said first color light beam, and said third and fourth overlap regions comprise a second dopant implanted into a substrate for illuminating said second color light beam.

20. The multichromatic flat panel display of claim 19, wherein at least one of said first and second implanted dopants comprise at least one of Cu, Mn, TbF$_3$, PrF$_3$, Ce, Te or Eu.

21. The multichromatic flat panel display of claim 17, wherein said reflective material comprises aluminum.

22. The multichromatic flat panel display of claim 17, wherein said first and second overlap regions comprise a first etched phosphor compound for illuminating said first color light beam, and said third and fourth overlap regions comprise a second etched phosphor compound for illuminating said second color light beam.

23. The multichromatic flat panel display of claim 22, wherein at least one of said first and second phosphor compounds comprises Cu, Mn, TbF$_3$, PrF$_3$, Ce, Te or Eu.

* * * * *